No. 756,854. PATENTED APR. 12, 1904.
W. W. HELLE & R. BROCKMAN.
COMPOUND TOOL.
APPLICATION FILED JAN. 22, 1904.
NO MODEL.
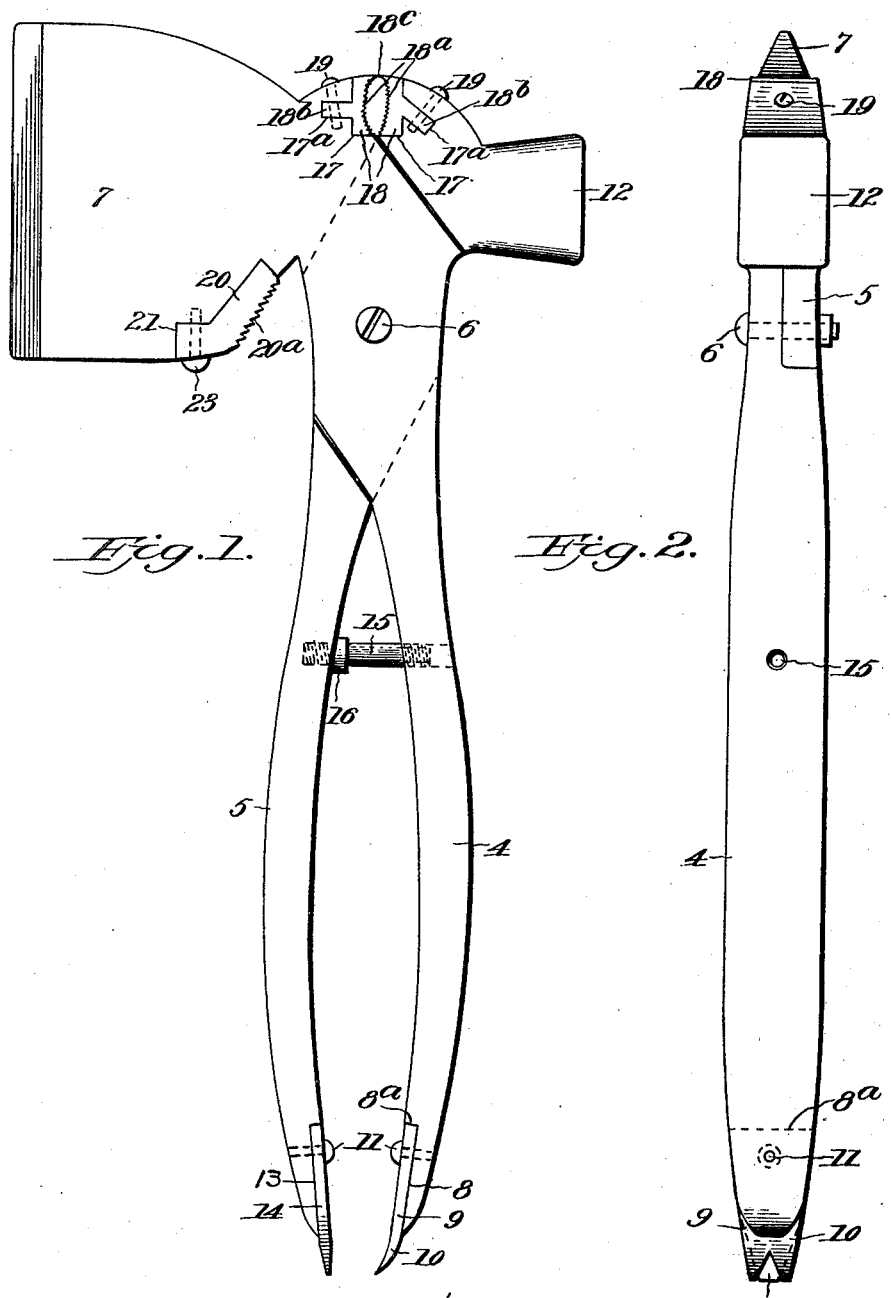

No. 756,854. Patented April 12, 1904.

UNITED STATES PATENT OFFICE.

WARREN W. HELLE AND RUDOLPH BROCKMAN, OF HINSDALE, ILLINOIS.

COMPOUND TOOL.

SPECIFICATION forming part of Letters Patent No. 756,854, dated April 12, 1904.

Application filed January 22, 1904. Serial No. 190,182. (No model.)

*To all whom it may concern:*

Be it known that we, WARREN W. HELLE and RUDOLPH BROCKMAN, citizens of the United States, residing at Hinsdale, in the county of Dupage and State of Illinois, have invented certain new and useful Improvements in Compound Tools; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in compound tools, and has for its object to provide a handy tool which shall embrace a screwdriver, tack-puller, punch, wrench, wire-cutter, tongs or pliers, hammer, and hatchet.

A further object is to provide a construction whereby the parts may be readily removed and replaced when worn.

In the accompanying drawings, Figure 1 is an elevation of the tool. Fig. 2 is an edge view thereof.

Referring specifically to the drawings, 4 and 5 indicate, respectively, the handles of the tool. They are pivoted together near their upper ends, as at 6, the parts being halved, as is usual in tools having pivoted handles. The handle 4 has at its upper end a hatchet-blade 7, and the opposite end is recessed, as at 8, to receive a shank 9, having at its outer end a claw 10, which forms a tack-puller. The shank 9 is secured in the recess by a screw 11, and said recess has a shoulder $8^a$, against which the shank abuts and which prevents sidewise swing of the latter.

The handle 5 has at its upper end a hammer-head, and its opposite end is recessed, as at 13, to receive the shank of a screw-driver 14, the same being secured in the recess in the same manner as the tack-puller.

On the inner side of the handle 4 a hollow punch 15 is secured, and opposite thereto on the handle 5 is a disk 16, forming a seat for the punch. The punch and seat both have a threaded stem extending into a threaded hole in the handles, whereby they are secured thereto.

The meeting faces of the parts 7 and 12 are recessed, as at 17, to receive blocks 18, which form the tongs or pliers. The blocks have roughened or serrated faces $18^a$ and are also slightly concaved, as is usual in tongs and pliers, to securely grip the object to be operated on. The recesses 17 have a mortise $17^a$ to receive a tenon $18^b$ on the blocks 18, and screws 19, extending therethrough, securely hold the parts in place. The outer ends of the blocks are formed with a sharp point $18^c$, which can be used for cutting wire.

A block 20 is secured to the under side of the hatchet-blade adjacent to the handles, said parts forming the jaws of a wrench. The face of the block is disposed at an angle to the handles and is roughened or serrated, as at $20^a$. The hatchet-blade is recessed, as at 21, to receive the block 20, the same being secured in said recess by a screw 23.

By the construction above described a handy and convenient tool is had. The various parts can be readily removed and replaced when worn by simply removing the screws whereby they are secured.

Having thus described our invention, what we claim, and desire to secure by Letters Patent, is—

A tool comprising pivoted handles, one of said handles having a hatchet-blade, and a block secured to the under side of said blade adjacent to the handles, and having a serrated face disposed at an angle to said handles, said block and handles forming adjustable wrench-jaws.

In testimony whereof we have affixed our signatures in presence of two witnesses.

WARREN W. HELLE.
RUDOLPH BROCKMAN.

Witnesses:
H. G. BATCHELOR,
SIGNA FELTSKOG.